R. J. MEITNER.
NUMBER ILLUMINATING DEVICE FOR MOTOR VEHICLES.
APPLICATION FILED APR. 27, 1916.
1,240,470.
Patented Sept. 18, 1917.
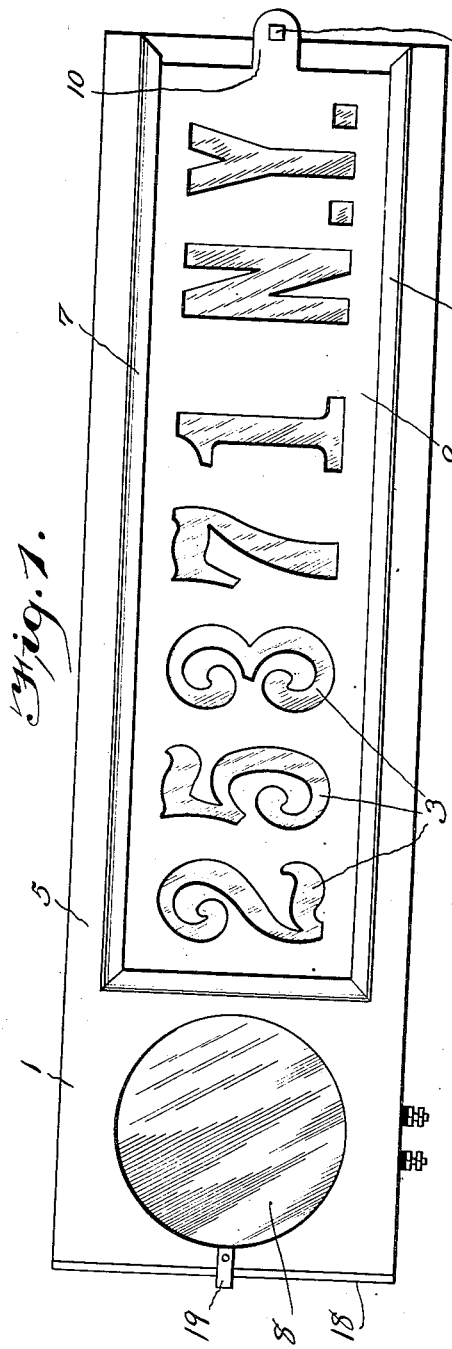
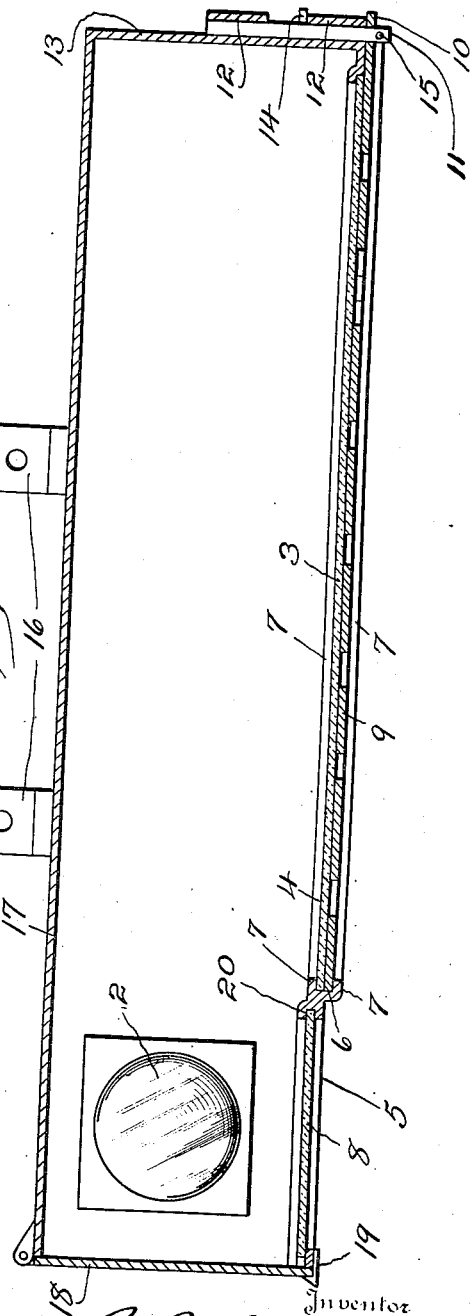

UNITED STATES PATENT OFFICE.

RUDOLPH J. MEITNER, OF DODGE CITY, KANSAS.

NUMBER-ILLUMINATING DEVICE FOR MOTOR-VEHICLES.

1,240,470.   Specification of Letters Patent.   Patented Sept. 18, 1917.

Application filed April 27, 1916. Serial No. 93,907.

*To all whom it may concern:*

Be it known that I, RUDOLPH J. MEITNER, a subject of Francis Joseph II, Emperor of Austria, (have declared my intentions and petitioned for citizenship,) residing at Dodge City, in the county of Ford and State of Kansas, have invented certain new and useful Improvements in Number-Illuminating Devices for Motor-Vehicles, of which the following is a specification.

My invention has relation to new and useful improvements in signal and number illuminating devices for use upon automobiles or motorcycles.

The main object of my invention is to provide a device of the above nature that will cause the license number to be clearly displayed, as by illumination, as well as display a signal by means of the identical light which is employed for the illumination of the number, said signal being of the color desired, according to the purpose for which it is intended.

A further object of my device is to produce the above invention inexpensively, ornamental in design, one which will be efficient in operation and which will be strong in construction and durable in use.

A further object of the invention is to provide an illuminating device of the above nature, which may be readily and easily secured to the rear end of an automobile or motorcycle whenever there is sufficient room for a tag.

It will be here pointed out that the source of illumination may consist of any form of lamp adapted for the purpose.

With the foregoing and other objects in view my invention consists of the novel features of construction, combination and arrangement of parts as described in this specification, illustrated in the drawings forming a part thereof, and particularly pointed out in the appended claim.

Reference being had to the drawings:

Figure 1 is a front elevational view of my invention.

Fig. 2 is a horizontal sectional view of the same.

Referring more particularly to the drawings, in which like numerals designate like parts throughout, my invention, in detail, is described as follows:

In lieu of employing a rear light, as now in common use, striking glancing rays of light upon a raised license number, I employ a box or receptacle 1, as illustrated, preferably of metal (tin or iron being the preferred metals), at one end of which receptacle I provide a lamp 2, emanating a light which is practically white; said lamp may employ as fuel either coal oil, prestolight, or any other fluid adapted for the purpose or may be replaced by an electric lamp, as will be obvious.

By constructing the box or receptacle oblong in shape, that is to say, a box whose longitudinal section is rectangular while its cross-section is square or substantially so, there will be sufficient space provided at the right or left of the lamp (it depending at which end of the box the lamp is installed) for the installation of a white glass 3 filling a longitudinal opening 4 provided in the rear wall 5 of the box, said white glass being received and held in place by a groove 6, formed by the flanges 7, running along the upper, lower and inner walls of the opening 4. Provided in the front wall 5 of the box immediately adjacent the lamp is an opening, which is filled by a red, translucent disk 8, which disk is preferably composed of stained glass.

Instead of employing the usual raised numbers, above mentioned, I provide suitable slides 9, preferably of heavy sheet iron, which may be painted any color required by the State, in which slides the numbers required by the owner of a machine are cut. Said slides 9, are also received and retained in position in front of the white glass 3 by means of the said grooves 6. Said slides are interchangeable with each other. By this arrangement, it will be readily seen, the numbers will show up evenly and distinctly as well as a red signal being provided, the same lamp providing illumination for both.

Each slide 9 is provided with a projection 10 at its farther end, which projection is provided with a square perforation therein which receives the outer end of a bolt 11, by means of which each slide, when in position in rear of the white glass 3, is held against longitudinal movement. Said bolt is arranged for limited longitudinal movement in perforated ears 12 secured to its adjacent end wall 13 of the box. The movement of the bolt is limited by a pin 14 protruding centrally therefrom, said pin being interposed between the ears 12, to limit the movement thereof. A small perforation 15 is provided at the outer end of said bolt for the purpose of permitting the insertion thereinto of a seal or pin (cotter-pin) when it is desired to hold the bolt in positive locked position with relation to the particular slide 9 being then employed.

Suitable brackets 16 are provided on the front wall 17 of the box whereby said box may readily be secured to the rear of an automobile or motorcycle. Said brackets may be altered to suit the peculiar circumstances involved in any case. The end wall 18 of the box adjacent the lamp is hingedly connected to the front wall thereof, the same, when in closed position, being held in such position by a spring catch 19, the purpose of which is to facilitate the handling of the lamp and the manipulation of the red glass disk 2 in placing it in proper position in its retaining grooves 20.

Although I have specifically described the novel features of construction combination and arrangement of the several elements of my invention yet I do not confine myself to same but reserve and may exercise the right to make such changes therein that do not depart from the spirit of the invention and as fall within the scope of the claim hereunto appended.

Having described my invention what is claimed, is:

An illuminating device of the class described comprising a light receiving casing having an opening in one wall thereof, a slide arranged in said opening, an apertured arm extending laterally from the slide, and a locking bolt slidably mounted on the side of the casing and movable into the aperture of the arm aforesaid.

In testimony whereof I affix my signature in the presence of two witnesses.

RUDOLPH J. MEITNER.

Witnesses:
 ED MESMER,
 C. G. ARGABRIGHT.